United States Patent [19]

Hoer

[11] 3,928,641
[45] Dec. 23, 1975

[54] METHOD OF COLLECTING PROTEIN FILAMENTS

[75] Inventor: Ralph A. Hoer, Ballwin, Mo.

[73] Assignee: Ralston Purina Company, St. Louis, Mo.

[22] Filed: Oct. 29, 1974

[21] Appl. No.: 518,765

[52] U.S. Cl. ............... 426/506; 426/507; 426/516; 426/517
[51] Int. Cl.² .......................................... A23P 1/00
[58] Field of Search .......... 426/516, 506, 507, 512, 426/364, 517; 425/461; 99/353; 264/202

[56] References Cited
UNITED STATES PATENTS

| | | | |
|---|---|---|---|
| 3,488,770 | 1/1970 | Atkinson | 426/104 |
| 3,662,672 | 5/1972 | Hoer | 426/364 X |
| 3,713,762 | 1/1973 | Oisugu | 425/461 X |
| 3,806,289 | 4/1974 | Schwarz | 425/461 X |
| 3,834,849 | 9/1974 | Supran et al | 426/516 X |

Primary Examiner—S. Leon Bashore
Assistant Examiner—Marc L. Caroff
Attorney, Agent, or Firm—Virgil B. Hill

[57] ABSTRACT

A method of continuously forming discrete elongated protein filaments from a proteinaceous material is disclosed wherein an aqueous slurry of the proteinaceous material having a solids content of between about 0.5 and 35 percent by weight is conducted under pressure through a heat exchange zone wherein elongated tender protein filaments are separated from the slurry and the heated slurry is continually removed from said zone through a back pressure creating orifice or discharge nozzle whereby elongated filaments are discharged into a collecting zone. A means of controlling the discharge of said filaments into the collecting zone is provided by confining the stream of said filaments exiting the orifice into the collecting zone to within a critically defined total angle of between about 4° and 90° said angle being measured in relationship to a theoretical axis through the center of said orifice. Confining the stream of said filaments to within said angle maintains discreteness and integrity of the individual protein filaments and avoids any undesirable aggregation of said filaments at the periphery of said collecting zone.

8 Claims, 2 Drawing Figures

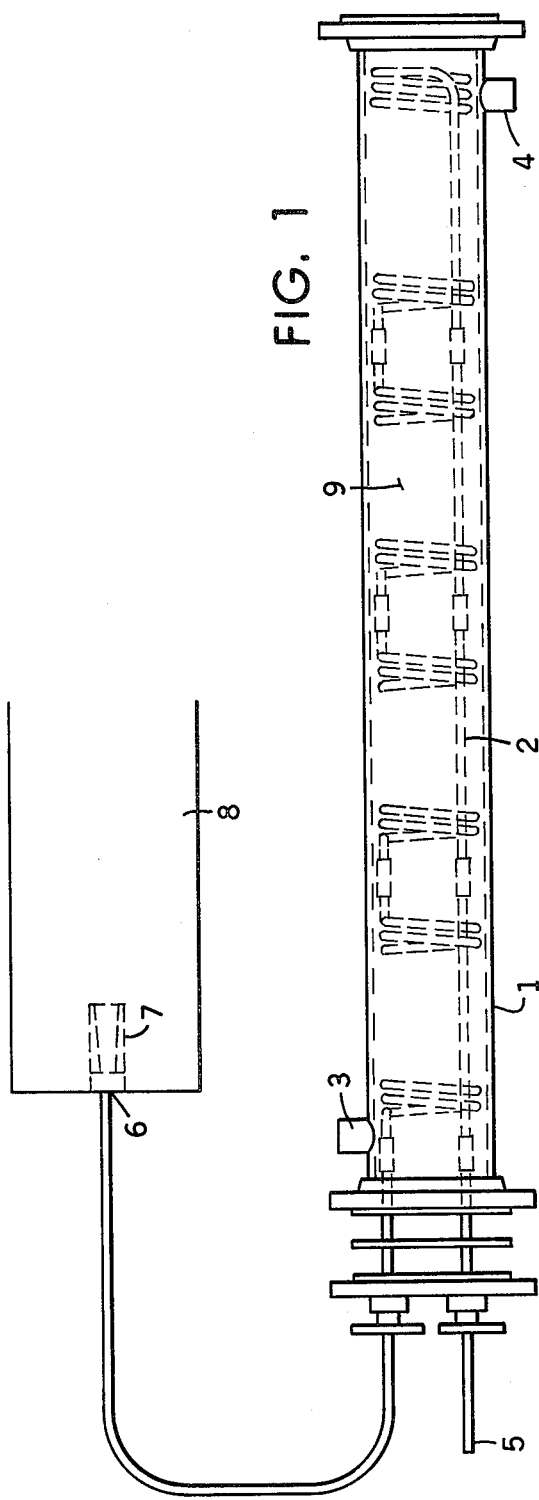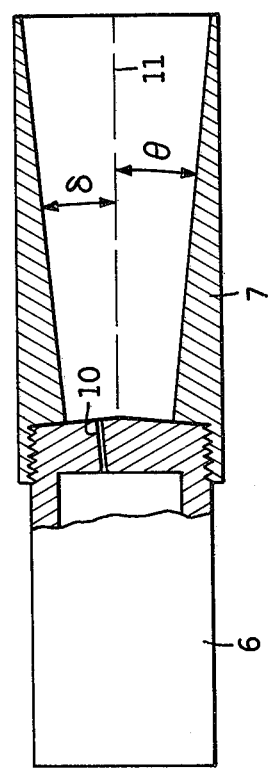

METHOD OF COLLECTING PROTEIN FILAMENTS

BACKGROUND OF THE INVENTION

Food scientists have long been interested in using a wide variety of protein sources to produce food products which resemble meat. Upon the most sought for alternatives have been processes for converting protein sources such as oilseed flours, meals, cereal proteins and microbial proteins into more acceptable protein food products particularly those that resemble meat in texture. This impetus has resulted in the development of a wide variety of techniques to produce textured protein food products resembling meat. The most common technique has been the wet spinning process as disclosed in U.S. Pat. No. 2,730,447 to R. A. Boyer. The wet spinning process generally produces protein fibers by extruding a plurality of fine streams of an aqueous solution of protein into an acid, chemical coagulating bath. The protein coagulates into fine fibers which are then collected and treated to form an edible textured protein product. Other methods of producing textured protein products resembling meat have included a shred-like protein product formed by heat coagulation of undenatured protein as disclosed in U.S. Pat. No. 3,047,395 to Rusoff, et al.

Since the development of these early processes for forming textured protein products from a variety of edible protein sources, expanded textured products have been produced by the extrusion of a proteinaceous source through an environment of elevated pressure and temperature into an environment of substantially lower pressure, with resultant puffing and expansion thereof. The expanded cellular product has textural characteristics upon rehydration with water which is very similar to a real piece of meat. Extrusion techniques for the production of expanded cellular protein products, especially those derived from oilseed meals, are described in U.S. Pat. Nos. 3,488,770 and 3,496,858.

More recently a process for the production of protein filaments from a wide variety of protein sources has been disclosed, and provides a method of producing edible protein filaments without a requirement for special equipment, thereby avoiding a large capital expenditure in order to commercialize the process. The noted process has generally involved the heating of a slurry of proteinaceous material by conducting the slurry through a heat exchanger at a proteinaceous solids level of between about 0.5 and 35 percent by weight, under pressure, and heating the slurry in the heat exchanger for a sufficient period of time so that elongated filaments can be caused to separate from the remaining constituents of the slurry. The heated slurry is thereafter continuously removed from the heat exchange zone through a back pressure creating orifice into a collecting zone wherein discrete elongated filaments and the remaining constituents of the slurry are discharged into the collecting zone and separated. The protein filaments which are formed are highly useful in making a wide variety of food products, and may be conveniently incorporated with conventional meat sources to form food products having improved aesthetic appeal, flavor and economy. Processes of the above type which may be included to form these unique elongated protein filaments include those described in U.S. Pat. Nos. 3,662,671, 3,662,672, 3,821,453 and Re. 28,091, all of which are incorporated by reference. These processes have provided an effective solution to the attendant problems associated with prior art processes for the production of textured protein products from a variety of protein sources.

The present invention is specifically intended to comprise an improvement over the processes disclosed in the above identified patents since in the commercial production of the protein filaments produced pursuant to the above processes a problem was encountered with the discharge of the protein filaments through the back pressure creating orifice into the collecting zone. This problem was associated with the fact that a large drop in temperature and pressure occurs between the back pressure creating orifice and the collecting zone, thereby creating a situation where atomization of the slurry takes place because of moisture "flash off," thereby forming very small fine filaments which exit the restricted orifice at a rather sharp angle and, therefore, agglomerate and lump together in the periphery of the collection zone. These lumps of agglomerated, very fine fibers periodically break loose in the collection system and create undesirable lumps in the final product. Although it has previously been determined that instantaneous flash cooling of the filaments upon exit from the orifice into the collecting zone prevents substantial adhesion between the filaments because of the semi-polymerized or adhesive state the filaments are in, nevertheless, with instantaneous cooling of the filaments a rapid decrease in temperature took place thereby causing atomization of the slurry at the periphery of the flow from the back pressure creating orifice into the collecting zone because of instantaneous flash off of a percentage of the moisture in the slurry. This resulted in the random discharge of a number of extremely fine filaments created by atomization of the slurry. These individual fine filaments were then segregated from the main flow of filaments and lumped or aggregated on the periphery of the collection zone thus being periodically flushed into the collecting system creating undesirable lumps of protein filaments.

The present invention obviates the above identified difficulties in the collection zone of the above noted processes, and prevents agglomeration of these very fine filaments which occur because of atomization of the slurry at the periphery of the flow from the orifice into the collecting zone. The improvement is achieved by controlling the discharge of said filaments in the collecting zone by confining the stream of said filaments exiting the orifice into the collecting zone to within a critically defined total angle of between about 4° and 90°, said angle being measured in relationship to an axis through the central portion of the nozzle or back pressure creating orifice. Confinement of the stream of filaments to within the critically defined angle, prevents lumping at the periphery of the collecting zone of these extremely fine filaments, which are created by atomization of the slurry and prevents the undesirable discharge of lumps of these filaments into the final product. In the present invention, confinement of the stream of said filaments to avoid undesirable aggregation of any fine filaments in the periphery of the collecting zone is achieved by employing a discharge shield adapted to the back pressure creating orifice or nozzle having a conical diverging section with a total angle of between about 4° and 90° as measured in relationship to the axis running through the central portion of the nozzle or back pressure creating orifice. Although not limiting, it is preferred that the conical diverging section have a length of at least about 1 inch and that the total angle of the conical diverging section be at least equal to or greater than the spray angle or angle of discharge of the slurry from the nozzle. In this manner, the discreteness of the protein filaments is maintained through the collecting zone since the critical angle of the shield confines substantially all of the filaments formed upon exit from the orifice for a short distance, including any very fine filaments formed by atomization of the slurry at the periphery of the flow from the restricted orifice and prevents accumulation or lumping of these fine filaments at the periphery of the collection zone.

BRIEF DESCRIPTION OF THE DRAWINGS

FIG. 1 represents a typical heat exchanger apparatus employed in the instant process for the production of protein filaments.

FIG. 2 represents a detailed view of the back pressure creating orifice of the heat exchanger apparatus together with the discharge shield having a conical divergent section with a critically defined angle to provide a process for the production of discrete protein filaments.

DESCRIPTION OF THE PREFERRED EMBODIMENTS

As previously discussed, the present invention involves heating of the slurry of a proteinaceous material by conducting the slurry through a heat exchanger under high pressure. This slurry preferably will have a solids content of about 0.5 to 35 percent by weight with the limit insofar as solids content being primarily dependent upon the mechanical limitations of the pump to be employed. After the proteinaceous slurry passes through the heat exchanger, it is conducted through a back pressure creating orifice which may have a single or a plurality of adjacent openings therein. It has been determined that most of the attendant problems of aggregation or lumping are encountered when a plurality of the formed elongated filaments are discharged into the collecting zone since the filaments are in a slightly adhesive state. In this regard, the fibers or filaments are usually immediately contacted with a cooling medium such as air or water in the collecting zone which is effective to cool the protein filaments to prevent the adhesion thereof. As has been previously noted, however, with sufficient cooling, very fine filaments can be formed by atomization of the slurry, which are randomly discharged from the orifice into the collecting zone and then agglomerate in the collecting zone. Lumping of any of these fine filaments formed during the process at the periphery of the collection zone can be prevented by confining the stream of filaments exiting the orifice into the collecting zone to within a critically defined total angle of 4° and 90°, said angle being measured in relationship to an axis through the center of the nozzle or back pressure creating orifice. Although the particular means or apparatus which may be employed to control discharge of the filaments to within the desired critical angle is not intended to limit the present process, control is conveniently achieved by the use of a discharge shield adapted to said back pressure creating orifice, said shield having a conical diverging section with a total angle of between about 4° and 90° as measured from an axis through the center of the nozzle or back pressure creating orifice. In this manner, discharge of all of the filaments, including any fines, from the orifice into the collecting zone is maintained within a well defined stream, and no undesirable lumping or aggregation of the very fine filaments occurs at the periphery of the collection zone.

Referring now to FIG. 1, which is intended to provide a more complete understanding of the total process of the present invention and the relationship of the present improvement to this process, a typical heat exchanger apparatus employed in the production of the edible protein filaments is shown. The heat exchanger illustrated in FIG. 1, is a relatively simple piece of apparatus having a shell 1, with an inner chamber 9. Steam flows through the inner chamber through the entrance opening 3 and exits the chamber of the heat exchanger through exit part 4. Tubular section 2 represents typical tubing or a heat exchanger and can comprise any type of metal desired, although stainless steel is preferred. The exact size of the tubing is not intended to limit the present invention and any standard heat exchanger tubing may be employed between ¼ inch and 1½ inches outside diameter. For the present invention, it is preferred that the tubular section have an outside diameter of about ⅜ inch. The length of the tubular section is further not critical to the practice of the present invention and as is represented by FIG. 1, the tubing may be compressed in a number of coils within the shell of the heat exchanger to provide both straight sections and coiled sections of tubing. A typical and preferred length for the tubular section 2 of the heat exchanger apparatus of the present invention is between about 20 and 170 feet. The proteinaceous slurry is pumped into the heat exchanger at the entrance point 5 and cycles through the tubular section 2, under pressure, during which the temperature is elevated by the steam in chamber 9. A restricted or back pressure creating orifice 6 is provided, which exits into collection zone 8, which is further not intended to limit the present invention and an orifice having a single or multiple openings may be employed. It is preferred that an orifice be employed which has a plurality of openings since these provide a means of increasing the filament production capacity of the system. A typical back pressure creating orifice as employed in the instant invention comprises a stainless steel nozzle having between about 9 and 25 openings each with a diameter of between about 0.015 and 0.030 inches.

The back pressure creating orifice 6 is then fitted with a discharge shield 7 having a conical divergent section with a critically defined total angle of between about 4° and 90°, said angle being measured from a theoretical axis through the center of the orifice or nozzle. The critically defined angle provides a means of insuring smooth flow of the filaments into the collecting zone and prevents the random discharge of filaments at a sharp angle in relationship to the orifice openings thereby avoiding lumping or aggregation of any very fine filaments at the extremities of the collection zone.

The discharge shield 7 and back pressure creating orifice 6 may be more fully described in reference to FIG. 2 which shows a detailed arrangement of this specific portion of the apparatus. The nozzle or back pressure creating orifice 6 is indicated having openings 10, which are preferably also disposed at some angle in relationship to the theoretical axis through the center of the nozzle or back pressure creating orifice 6. The exact spray angle is not critical to the practice of the present invention and in fact the surface of nozzle 6 can be completely flat, if desired. A preferred spray angle for nozzle openings 10 is about 5 degrees. With reference to FIG. 2, which shows only a single nozzle opening 10 for the purposes of illustration, a theoretical axis 11 is provided through the center of the nozzle or back pressure creating orifice 6 to provide a suitable reference point for the angles referred to in the description of the instant invention. The spray angle or angle of discharge of the slurry through opening 10 is preferably at about 5° as measured in relationship to axis 11.

Discharge shield 7 which provides the means for confinement of the stream of the slurry to within the critically defined total angle of between 4 and 90°, has a conical diverging section wherein the critical angle is measured in relationship to theoretical axis 11, and comprises the total of angle $\delta$ and angle $\theta$. These angles are presented in FIG. 2 for the purposes of illustration. It is further preferred pursuant to control of the discharge of the filament stream that the conical diverging section of the discharge shield have a total angle $(\delta+\theta)$ which is at least equal to or greater than the spray angle or angle of discharge of the slurry from the nozzle. The angle of discharge or spray angle is, of course, measured as the angle between a theoretical axis through nozzle opening 10 and theoretical axis 11, through the center of the orifice.

It is further preferred that discharge shield 7 have a conical diverging section of the noted critical angle with a length of at least about 1 inch and most preferably about 3 inches. The diameter of the conical divergent section 7 at the outer end is not at all critical to the practice of the present invention and can be of any size.

The proteinaceous material which may be used to produce the discrete filaments pursuant to the general process of this invention, include vegetable protein materials such as soy or other oilseed protein materials, e.g., oilseed meals, concentrates, or isolates, although other oilseed materials such as sesame, cottonseed, peanut and the like may be employed. It is further desirable to employ animal protein sources such as albumen and casein or microbial protein from sources such as brewers or torula yeast depending upon the functional characteristics of the product desired. Following formation of the aqueous proteinaceous slurry with a proteinaceous solids content of between about 0.5 and 35 percent by weight, it is conducted through a heat exchanger under pressure and heated for a sufficient period of time so that elongated discrete protein filaments can thereafter be separated from the remaining constituents of the slurry. The heated slurry is thereafter continuously removed from the heat exchange zone through the restricted orifice employing the discharge shield of the instant invention, thereby controlling the stream of filaments exiting the orifice into the collecting zone within a critically defined angle and avoiding any lumping or aggregation of any fine filaments at the periphery of the collection zone. As has been previously noted, the number of openings which may be employed on the discharge nozzle or back pressure creating orifice of the instant invention is not intended to limit the same and single or multiple openings may be conveniently employed. The noted reaction for the formation of the discrete protein filaments takes place as a function of time, temperature and pressure. Temperatures of between about 240° and 315°F. are preferred, especially for soy protein, although the protein may degrade somewhat if heated at too high of a temperature for too long.

The process may further be operated over a wide pressure range, and pressures above about 50 psig are quite satisfactory to produce the desired texture. Preferably back pressures of between about 50 and 5,000 psig are used. A back pressure creating restrictive orifice is placed in the exit line from the heat exchanger into the collecting zone which provides back pressure on the system but is generally intended to control the shape of the product. In general, circular orifices either having single or multiple openings with a diameter of between about 0.015 and 0.030 inches are quite satisfactory. Rectangular orifices have also proven to be satisfactory for some applications.

The resultant effect of controlling discharge of the filaments into the collecting zone from the orifice within the critically defined total angle of 4° to 90°, insures that discreteness of the filaments is maintained and at the same time preventing any undesirable aggregation or lumping of fine filaments in the collecting zone. It is further preferable pursuant to the instant invention that the discharge shield adapted to the orifice have a critically defined total angle of between about 4° to 90° wherein the total angle is at least equal to or greater than the spray angle or angle of discharge of the slurry from the nozzle. The divergency of the nozzle thus provides a means of directing the entire stream of filaments away from the orifice into the collecting zone in a manner so that no adhesion, lumping or aggregation of any fine filaments occurs. The improved method for producing edible protein structures will be more apparent from the following example in order to illustrate the invention although the following is not intended to limit the scope thereof.

EXAMPLE 1

Twenty-five pounds of an acid precipitated, dried soy protein isolate having a protein content of 90 – 95 percent by weight was slurried with 75 pounds of water. The slurry was ground and the resultant slurry had a solids content of 25 percent by weight. The slurry was pumped at a pressure of from about 200 to 2,000 psig through a four coil heat exchanger made of 80 feet of ⅜ inch × 0.209 inch ID seamless stainless steel tubing in a 6 inch pipe. The temperature of the heat exchanger was set at 305°F. and the heated slurry was expelled through a nozzle or orifice having 15 openings therein of a diameter of about 0.019 inch, said openings being arranged in a concentric fashion around the central part of the nozzle and oriented at an angle of about 5° from the central part of the nozzle. A conically shaped divergent discharge shield was placed over the above identified nozzle having a conical diverging section with a total angle of 12° with a length of 3 1/16 inches and a diameter at the exit end of 1⅜ inches. As individual filaments from the proteinaceous slurry exit from the orifice into the collecting zone, the stream of filaments are directed in a manner to prevent undesirable aggregation and lumping of any fine filaments in the collection zone.

While the instant invention has been described in terms of preferred embodiments it is to be understood that various changes may be made and equivalents may be substituted for elements thereof, without departing from the true spirit and scope of the invention. In addition, many modifications may be made to adapt a particular situation or material to the teaching of the invention without departing from the essential teachings.

What is claimed is:

1. In a method of continuously forming discrete elongated protein filaments from proteinaceous material wherein an aqueous slurry of the proteinaceous material is formed having a proteinaceous solids content of between about 0.5 and 35 percent by weight, the discrete elongated filaments being formed by continuously conducting the slurry under pressure through a heat exchange zone and in said zone heating the slurry to a temperature which is above 240°F. but which is less than that which will degrade the protein, whereby the protein is subjected to such temperature for a sufficient period of time so that elongated tender filaments are thereafter separated from the remaining constituents of the slurry and the heated slurry is continuously removed from said zone through a back pressure creating orifice whereby the elongated filaments and remaining constituents of the slurry are discharged into a collecting zone and in the collecting zone the discrete filaments are separated from the remaining constituents of the slurry, the improvement comprising; controlling the discharge of said filaments into the collecting zone by confining the stream of said filaments being discharged from said orifice into the collecting zone to within a total angle of between about 4 and 90° said angle being measured from an axis through the center of said orifice, in order to maintain discreteness of the filaments in said collecting zone.

2. A process as set forth in claim 1 wherein the stream of said filaments is confined within a total angle of about 12°.

3. A process as set forth in claim 1 wherein the slurry is subjected in the heat exchange zone to a pressure of between about 50 and 5,000 psig.

4. A process as set forth in claim 1 wherein the total angle is at least equal to or greater than the angle of discharge of said slurry from said orifice into the collecting zone.

5. A process as set forth in claim 4 wherein said angle of discharge is about 5°, said angle being measured in relationship to an axis through the center of said orifice.

6. A process as set forth in claim 1 wherein said stream of filaments is confined by a discharge shield placed over said orifice said shield having a conical diverging section with a total angle of between about 4° and 90°, said angle being measured in relationship to an axis through the center of said orifice.

7. The process as set forth in claim 6 wherein said shield has a length of at least about 1 inch.

8. The process as set forth in claim 7 wherein said shield has a length of about 3 inches.

* * * * *